(12) United States Patent
Fellague

(10) Patent No.: US 10,300,951 B2
(45) Date of Patent: May 28, 2019

(54) TIE STRING ATTACHMENT BETWEEN VEHICLE SUB-FRAME AND REAR FLOOR

(71) Applicant: Ford Global Technologies, LLC, Dearborn, MI (US)

(72) Inventor: Nour-Eddine Fellague, Windsor (CA)

(73) Assignee: Ford Global Technologies, LLC, Dearborn, MI (US)

( * ) Notice: Subject to any disclaimer, the term of this patent is extended or adjusted under 35 U.S.C. 154(b) by 37 days.

(21) Appl. No.: 15/473,978

(22) Filed: Mar. 30, 2017

(65) Prior Publication Data

US 2018/0281862 A1 Oct. 4, 2018

(51) Int. Cl.
*B62D 25/20* (2006.01)
*B62D 21/15* (2006.01)
*B62D 27/02* (2006.01)

(52) U.S. Cl.
CPC ......... *B62D 21/15* (2013.01); *B62D 25/2009* (2013.01); *B62D 27/023* (2013.01)

(58) Field of Classification Search
CPC .. B62D 33/077; B62D 24/02; B62D 25/2054; B62D 27/02; B62D 65/02; B62D 65/024
USPC ... 296/29, 35.1, 190.07, 193.07, 181.2, 204, 296/35.2, 37.2, 37.6; 29/525.03; 24/456; 180/299, 312, 190, 291, 900; 280/781, 280/154, 797, 801.1, 848, 854
See application file for complete search history.

(56) References Cited

U.S. PATENT DOCUMENTS

| | | | |
|---|---|---|---|
| 8,827,340 B2 * | 9/2014 | De Luca | B62D 25/20 296/181.2 |
| 9,434,424 B2 | 9/2016 | Hudson et al. | |
| 2005/0134069 A1 * | 6/2005 | Odulio | B62D 24/02 296/35.1 |
| 2010/0270819 A1 | 10/2010 | Gustafsson et al. | |
| 2012/0313399 A1 * | 12/2012 | Caliskan | B62D 25/20 296/193.01 |
| 2013/0168989 A1 * | 7/2013 | Sasage | B62D 24/02 296/35.1 |

FOREIGN PATENT DOCUMENTS

EP 1385717 B1 9/2010

* cited by examiner

*Primary Examiner* — D Glenn Dayoan
*Assistant Examiner* — Sunsurraye Westbrook
(74) *Attorney, Agent, or Firm* — Vichit Chea; Brooks Kushman, P.C.

(57) ABSTRACT

A vehicle floor assembly may include a frame and a floor panel attached to the frame via a plurality of mount fasteners, a plurality of string attachments, each welded to the frame and the floor panel to further attach the frame and the floor panel in addition to the mount fasteners and to provide additional resistance to buckling of the floor panel or the frame during a collision.

17 Claims, 5 Drawing Sheets

TIE STRING ATTACHMENT BETWEEN VEHICLE SUB-FRAME AND REAR FLOOR

TECHNICAL FIELD

This disclosure relates to a string attachment between a vehicle sub-frame and a rear floor.

BACKGROUND

Vehicles often include a frame to support the structure of a motor vehicle. Several components are attached to the frame during manufacturing. Sheet metal may be attached to the frame to create the vehicle floor. However, these components may be susceptible to damage such as buckling during a collision.

SUMMARY

A vehicle floor assembly may include a frame and a floor panel attached to the frame via a plurality of mount fasteners, a plurality of string attachments, each welded to the frame and the floor panel to further attach the frame and the floor panel in addition to the mount fasteners and to provide additional resistance to buckling of the floor panel or the frame during a collision.

A vehicle floor assembly may include frame and a floor panel attached to the frame via at least one pair of symmetrical string attachments, each of the pair being welded to the frame and the floor panel to provide resistance to buckling of the floor panel or the frame during a collision, wherein each of the pair is arranged at a same distance from a vehicle periphery on opposite sides of vehicle floor assembly.

BRIEF DESCRIPTION OF THE DRAWINGS

The embodiments of the present disclosure are pointed out with particularity in the appended claims. However, other features of the various embodiments will become more apparent and will be best understood by referring to the following detailed description in conjunction with the accompanying drawings in which:

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

The frame of a truck typically includes sheet metal mounted on a long ladder frame. The sheet metal and frame are attached together by body mount fasteners 106 at certain locations. Typically, there is a total of eight attachments including four in the front suspension and four in the rear suspension. During a vehicle collision, separation between the sheet metal and ladder frame may occur. The sheet metal and frame may both buckle upwards or both may buckle downwards. The sheet metal and frame may also buckle away from each other in opposite directions. Finally, the sheet metal and frame may buckle inward towards each other. In each case, the sheet metal and the frame are acting separately. That is, each component is absorbing force independent of the other. This may create a bending failure.

Disclosed herein is an attachment system that, because of the selection locations and coupling mechanisms, the sheet metal and frame may work together to absorb forces imposed during a collision. Because the two components share the applied forces, the components may resist horizontal loads through the main plane. This may reduce buckling and bending and thus reduce the intrusion into other vehicle parts such as the fuel tank.

In order to increase resistance to shear forces, more constraints for the attachments between the sheet metal and the frame may be added. A pair of steel strings may be arranged between the sheet metal and the frame to attach the two components. The strings may be arranged inside the outer periphery 112 of the frame at approximately a fourth of the inboard width of the vehicle. Allowing the strings to be arranged at this placement may produce more resistance to a crash of the safety design guidelines (SDG) 55 mph 70% offset. The strings may be arranged symmetrically about the vehicle's longitudinal axis.

Figure 1:
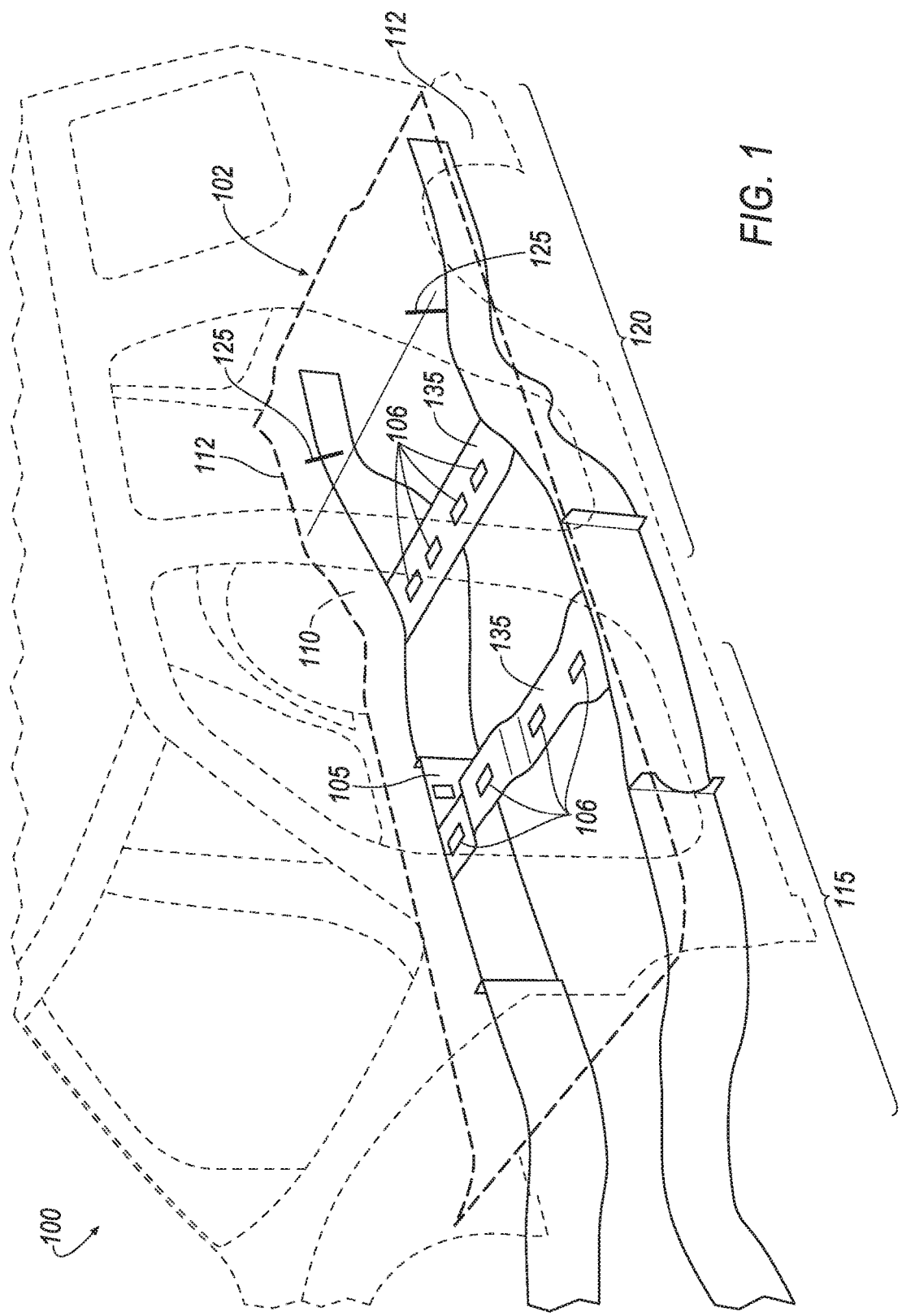
FIG. 1 illustrates an example vehicle having a vehicle floor assembly.

FIG. 1 illustrates an example vehicle 100. The vehicle 100 may be a motor vehicle such as a truck, sport utility vehicle, van, car, etc. The vehicle 100 may include a frame 105. The frame 105 may be a ladder frame configured to provide support for the base of the vehicle. The ladder frame may include two parallel rails extending the length of the vehicle. Several transverse cross-beams 135 may interconnect the rails and provide further structure and support.

The vehicle 100 includes a floor assembly 102 having floor panel 110 arranged on top of the frame 105. The floor panel 110 may form a floor of the vehicle. The floor panel 110 may be made of sheet metal or steel. The floor panel 110 may be approximately 0.8 mm gauge while the frame 105 may be approximately 3 mm. In traditional arrangements, the floor panel 110 may attach to the frame in one or more locations via welding, bolts, etc.

At least one string attachment 125 may attach the frame 105 to the floor panel 110. The string attachment 125 may include a high-strength steel string configured to be welded to each of the floor panel 110 and the frame 105 in order to attach the floor panel 110 to the frame. Additionally, the string attachment 125 may provide a strong enough attachment to each component that buckling and separation between the two components caused by a collision may decrease. The string attachment 125 may have a diameter as little as 4 mm. The string attachment 125 may have larger or smaller diameters. The length of the string attachment 125 may depend on a distance between the floor and sub-frame members. In some examples, the string attachment length may range from 100 mm to 300 mm.

The floor panel 110 may include two or more portions, such as a front floor 115 and a rear floor 120. During a collision, the rear floor 120 may buckle and separate from the frame 105 in response to forces affected by the collision. While the string attachment 125 is illustrated as being arranged at the rear floor 120, the string attachment 125 may be arranged at the front floor 115 as well or in the alternative.

The string attachments 125 may be arranged at a location close to the periphery 112 of the floor panel 110. In one example, this location may be inset from the periphery approximately one fourth of the total vehicle width. For example, if a vehicle is 7 feet wide, then the string attachments 125 may be placed approximately 1.75 feet inside of the outer periphery 112. The string attachments 125 may be arranged in symmetric pairs about a vehicle axis where a string is arranged on each side of the vehicle at the same inset from the periphery 112.

Furthermore, while two string attachments 125 are illustrated in FIG. 1, the more or less string attachments 125 may be implemented. More than 1 symmetric pair may be arranged along the vehicle periphery 112. Singular string attachments 125 may also be arranged throughout the vehicle.

In the example of FIG. 1, the string attachments 125 are arranged towards the rear of the vehicle at the rear floor 120. The string attachments 125 are arranged laterally in line with one another and are inset from the vehicle sides so as to align with the frame 105. While the string attachments 125 are illustrated as aligning with the rails of the frame 105, the string attachments 125 may also align with the transverse cross-beams 135.

Figure 2:
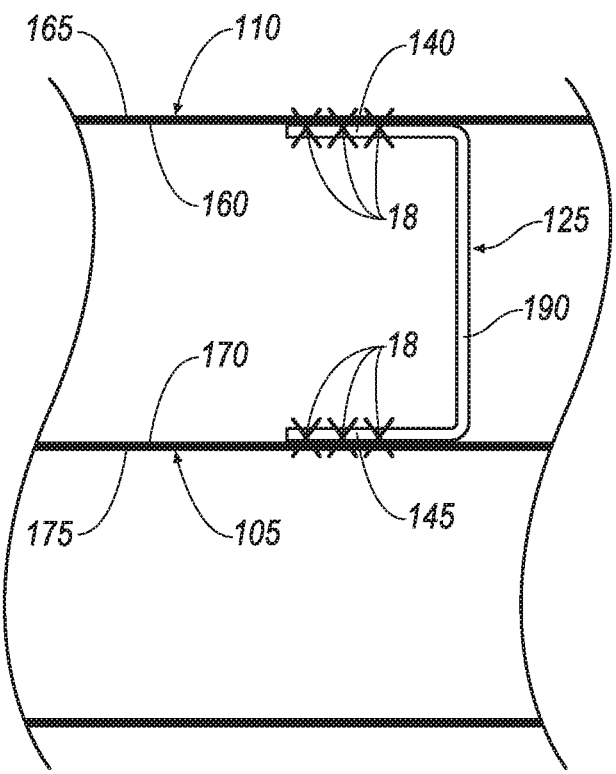
FIG. 2 illustrates a cross-sectional side view of the vehicle floor assembly, according to one embodiment.

FIG. 2 illustrates a cross-sectional side view of the floor assembly 102, including the floor panel 110, frame 105, and string attachment 125, according to one embodiment. The floor panel 110 may include a floor bottom side, or bottom surface 160 and a floor top side, or top surface 165. The frame 105 may include a frame top side, or top surface 170 and a frame bottom side or bottom surface 175. The floor bottom surface 160 may face the frame top surface 170.

In one example, the floor panel 110 and frame 105 are connected via the string attachment 125 in a U-shaped configuration. The string attachment 125 may include a first end 140 extending from a string body 190. The first end 140 may be arranged on the floor bottom surface 160. The string attachment 125 may include a second end 145 arranged on the frame top surface 170. Thus, the first end 140 and the second end 145 may be arranged parallel with each other.

While the first end 140 and second end 145 are illustrated as being substantially of the same length, other examples may be implemented where the first end 140 is longer than the second end 145, and vice versa. The first end 140 and the second end 145 may be welded to the respective surfaces of the frame 105 and floor panel 110. Such welding may include a plurality of spot welds 180. Spot welding may be advantageous in examples where the floor panel 110 is made of sheet metal that is 3 mm thick. Additionally or alternatively, seam welding could also be used, as well as butt welding, flash welding, projection welding, upset welding, etc. By using spot welding, a cost savings may be realized due to the automatic and quick mechanism preceded by spot welding. In addition to spot welding, one or more tack welds may also be used to keep the string attachment 125 in place prior to performing any spot welding.

As explained above, the string attachment 125 may be approximately 4 mm in diameter. Further, the string attachment 125 may vary in length, though the longer the string attachment 125 the more length of the string attachment 125 that is attached to the frame 105 and floor panel 110. The more length of the string attachment 125 attached to the components, the stronger the hold and the more resistance to failure.

Figure 3:
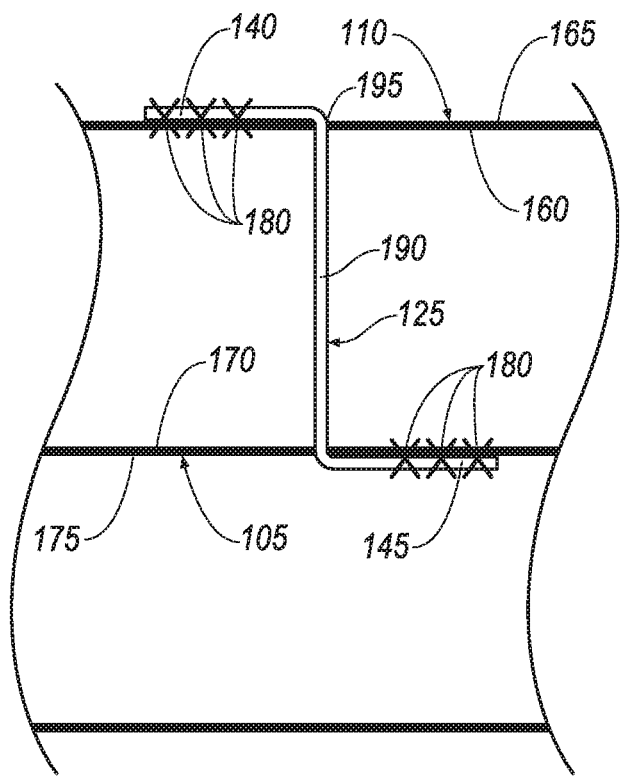
FIG. 3 illustrates a cross-sectional side view of the vehicle floor assembly, according to another embodiment.

FIG. 3 illustrates a cross-sectional side view of the floor assembly 102, including the floor panel 110, frame 105, and string attachment 125, according to another embodiment. In this example, the first end 140 of the string attachment 125 may extend parallel but extend in opposite directed from the string body 190 for form a z-shape. The first end 140 may be welded to the floor top surface 165 while the second end 145 may be welded to the frame top surface 170. In order for the string attachment 125 to be attached at the floor top surface 165, the floor panel 110 may define an opening 195 configured to receive the first end 140 of the string attachment 125.

The string attachment 125 may be arranged as a straight metal piece or string prior to installation on the floor panel 110 and frame 105. In this example, the string attachment 125 may be bent once arranged between the floor panel 110 and the frame 105. In some implementation, the first end 140 may first be welded to the respective surface of the floor panel 110. After welding thereto, the second end 145 may be bent to align with the frame 105. The second end 145 may then be welded to the frame 105. The reverse could also be performed where the second end 145 is first welded with the first end 140 to subsequently be bent and welded.

Additionally or alternatively, the string attachment 125 may be arranged in a U-shape prior to installation. With respect to the example illustrated in FIG. 3, the string attachment 125 may also be arranged in an L-shape. The first end 140 may be inserted through the opening 195 and bent over the floor panel 110.

During collisions, several types of buckling of the frame 105 and floor panel 110 may occur. In a first and most common example, the frame 105 and the floor panel 110 may buckle upward in the same direction. In this example, the string attachment 125 may create a higher resistance to the buckling by allowing the frame 105 and floor panel 110 to share the shear forces created by the impact. In the event of a rear collision, impact may improve by 26 mm for aluminum floor panels and 15 mm for sheet metal (e.g., steel) floor panels.

In a second example, though rare, the frame 105 and floor panel 110 may buckle away from each other in opposite directions. In a third example, which is also rare, the frame 105 and the floor panel 110 may buckle downward in tandem. In a fourth example, the frame 105 and the floor panel 110 may buckle inward towards each other. In this example, the string attachment 125 may be compressed between the frame 105 and floor panel 110.

Figure 4:
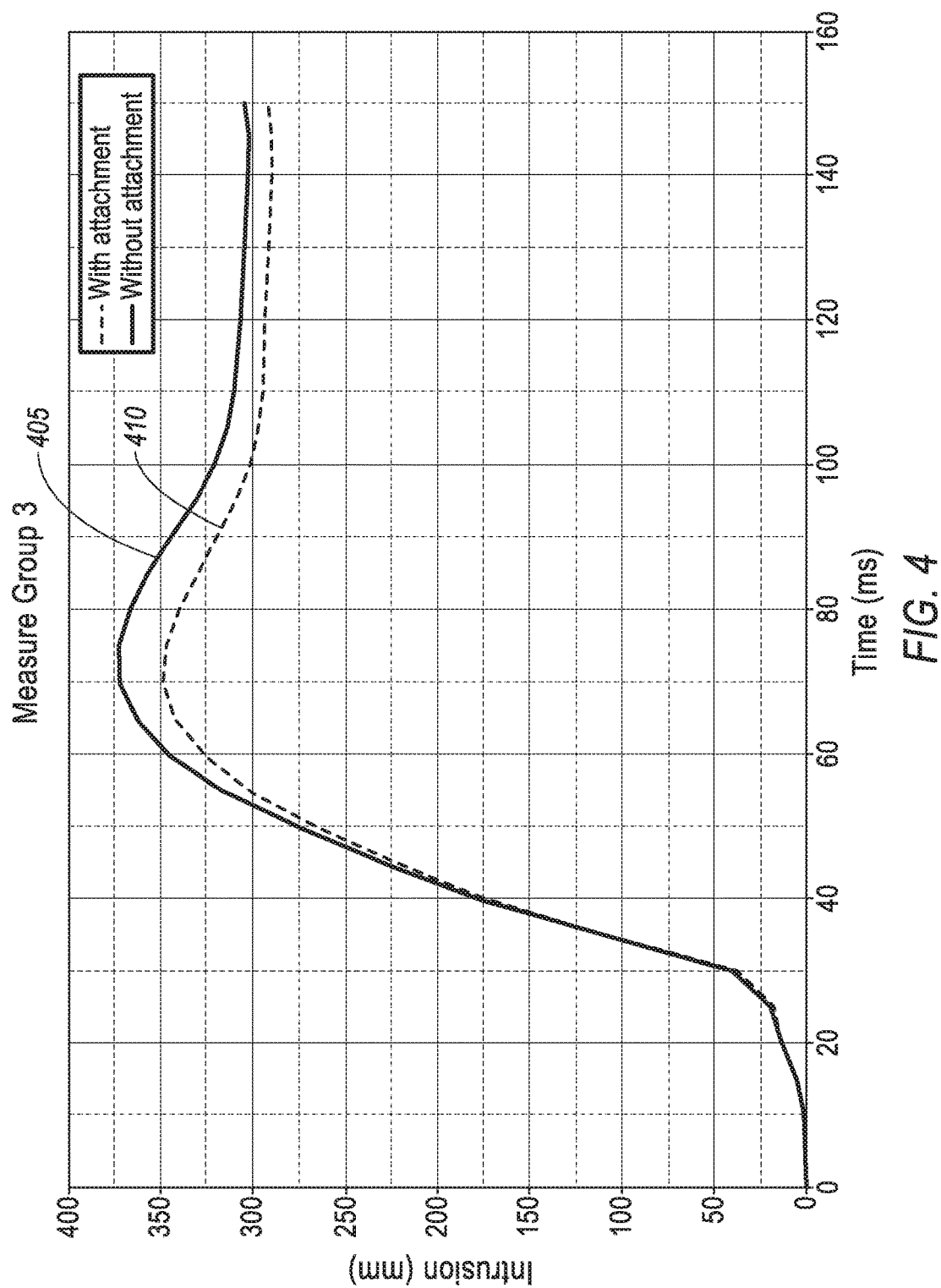
FIG. 4 illustrates a chart showing an intrusion analysis for the floor panel.

FIG. 4 illustrates a chart showing an intrusion analysis for the floor panel 110. The intrusion analysis may be performed during collision testing to measure the buckling of the floor panel 110. In the chart illustrated in FIG. 4, an aluminum floor panel 110 was analyzed.

The lines illustrate an example intrusion in millimeters over time in milliseconds of a collision of 400 millimeters. A first line 405 illustrates a traditional floor panel without the use of string attachments 125. A second line illustrates a floor panel including string attachments 125. As illustrated, and overall decrease in intrusion or buckling occurs with the use of one or more string attachments 125.

Figure 5A:
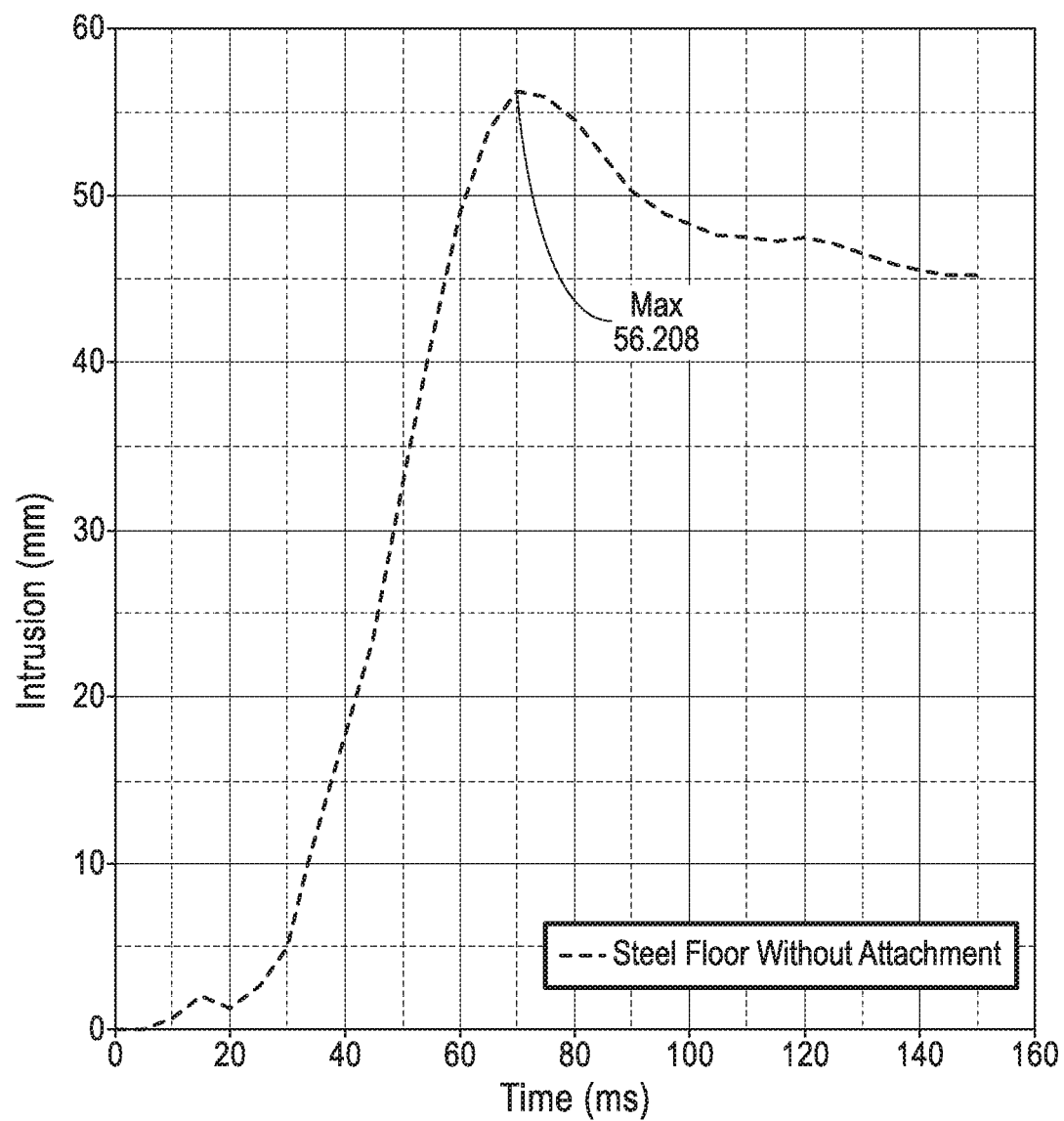
FIG. 5A illustrates a chart showing a distance analysis for a traditional steel floor panel.
Figure 5B:
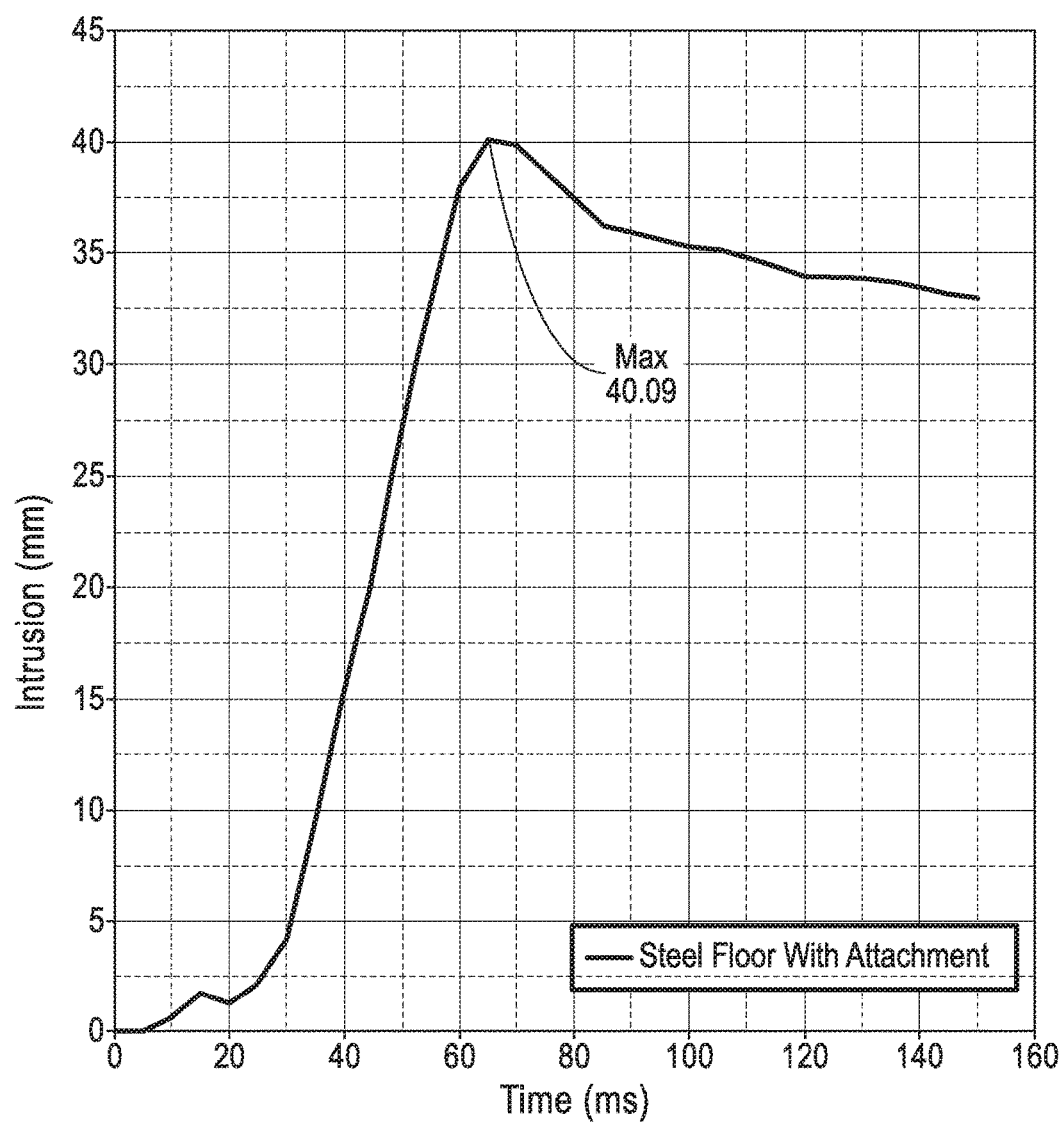
FIG. 5B illustrates a chart showing a distance analysis for the floor panel made of steel and attached to the frame via a string attachment.

FIG. 5A illustrates a chart showing a distance analysis for a traditional steel floor panel. The distance analysis examines the distance between the floor panel 110 and the frame 105 during a collision. FIG. 5B illustrates a chart showing a distance analysis for the floor panel 110 made of steel and attached to the frame 105 via the string attachment 125. As illustrated in FIG. 5B, intrusion into a vehicle near the fuel tank is lower than that of the example in FIG. 5A where a string attachment 125 was not used.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A vehicle floor assembly, comprising
a frame and a floor panel attached to the frame via a plurality of mount fasteners, and
a plurality of string attachments each including a first end to be welded to a portion of the floor panel and a second end to be welded to a portion of the frame to further attach the frame and the panel in addition to the fasteners and to provide additional resistance to buckling of the panel or the frame during a collision.

2. The assembly of claim 1, wherein the second end is welded to a top side of the frame facing the floor panel.

3. The assembly of claim 1, wherein the first end is welded to a bottom side of the floor panel facing the frame.

4. The assembly of claim 1, wherein the floor panel defines an opening to receive the first end of the string attachment.

5. The assembly of claim 4, wherein the first end extends through the opening and welded to a top side of the floor panel.

6. The assembly of claim 1, wherein the first and second ends are spot welded to the respective frame and floor panel.

7. The assembly of claim 1, wherein the string attachment is a steel string of approximately 4 mm in diameter.

8. The assembly of claim 1, wherein the string attachments include at least one symmetrical pair of string attachments arranged on each side of the vehicle, each of the string attachments of the symmetrical pair are inset at a same distance from a vehicle periphery.

9. A vehicle floor assembly, comprising
a frame and a floor panel attached to the frame via at least one pair of symmetrical string attachments, each of the pair being welded to the frame and the floor panel to provide resistance to buckling of the floor panel or the frame during a collision,
wherein each of the pair is arranged at a same distance from a vehicle periphery on opposite sides of vehicle floor assembly.

10. The assembly of claim 9, wherein the each of the pair includes a first end to be welded to a portion of the floor panel and a second end to be welded to a portion of the frame.

11. The assembly of claim 10, wherein the second end is welded to a top side of the frame facing the floor panel.

12. The assembly of claim 10, wherein the first end is welded to a bottom side of the floor panel facing the frame.

13. The assembly of claim 10, wherein the floor panel defines an opening to receive the first end of the each of the pair.

14. The assembly of claim 13, wherein the first end extends through the opening and welded to a top side of the floor panel.

15. The assembly of claim 10, wherein the first and second ends are spot welded to the respective frame and floor panel.

16. The assembly of claim 9, wherein the string attachment is a steel string of approximately 4 mm in diameter.

17. A vehicle floor assembly, comprising
a frame and a floor panel attached to the frame via a plurality of mount fasteners, and
a plurality of string attachments each including a first end to be welded to a portion of the floor panel and a second end to be welded to a portion of the frame to provide additional resistance to buckling of the floor panel or the frame during a collision.

* * * * *